United States Patent
Kim

[11] Patent Number: 6,019,676
[45] Date of Patent: Feb. 1, 2000

[54] MOTOR-VEHICLE PASSENGER-COMPARTMENT AIR-CLEANER

[76] Inventor: Sinil Kim, 548 Ford Ave., Solana Beach, Calif. 92705

[21] Appl. No.: 08/875,472

[22] PCT Filed: Oct. 23, 1996

[86] PCT No.: PCT/US96/17094

§ 371 Date: Jul. 24, 1997

§ 102(e) Date: Jul. 24, 1997

[87] PCT Pub. No.: WO97/15377

PCT Pub. Date: May 1, 1997

Related U.S. Application Data

[60] Provisional application No. 60/006,045, Oct. 24, 1995.

[51] Int. Cl.[7] .................................. B60H 3/06
[52] U.S. Cl. ..................... 454/155; 55/505; 454/158
[58] Field of Search .................. 454/155, 158; 55/385.2, 473, 505, 507

[56] References Cited

U.S. PATENT DOCUMENTS

| | | |
|---|---|---|
| 2,225,827 | 12/1940 | Frisby . |
| 2,277,552 | 3/1942 | Kneedler . |
| 3,195,440 | 7/1965 | Coscione et al. . |
| 3,763,760 | 10/1973 | Erickson . |
| 3,839,950 | 10/1974 | Kelly et al. . |
| 3,941,034 | 3/1976 | Helwig et al. . |
| 4,737,173 | 4/1988 | Kudirka et al. ................. 55/507 X |
| 5,169,356 | 12/1992 | Arold . |
| 5,192,346 | 3/1993 | Kowalczyk . |
| 5,266,091 | 11/1993 | McDonald ..................... 454/289 X |
| 5,302,153 | 4/1994 | Winters . |
| 5,350,443 | 9/1994 | Von Blucher et al. . |
| 5,350,444 | 9/1994 | Gould et al. ................... 454/158 X |
| 5,368,620 | 11/1994 | Chiba et al. . |
| 5,370,576 | 12/1994 | Krofchalk . |
| 5,720,660 | 2/1998 | Benedetto et al. .............. 454/289 X |

FOREIGN PATENT DOCUMENTS

| | | |
|---|---|---|
| 2310773 | 12/1976 | France . |
| 2636013 | 3/1990 | France . |
| 28 45 490 | 4/1980 | Germany ................ 454/158 |
| 2845445 | 5/1980 | Germany . |
| 35 14 038 | 10/1986 | Germany ................ 454/158 |
| 4303693 | 8/1994 | Germany . |
| 6-227249 | 8/1994 | Japan ..................... 454/158 |
| 6-293216 | 10/1994 | Japan ..................... 454/158 |

*Primary Examiner*—Harold Joyce
*Attorney, Agent, or Firm*—Fish & Richardson P.C.

[57] ABSTRACT

An air filtration method and device by which to more effectively clean the ambient air (19) being fed into a motor vehicle's passenger compartment, via the existing OEM ventilation and heating/air conditioning system (10, 15, 16). The notion of a special more conveniently accessible air filtration appliance (21) is set forth with generic variants showing adaptability to differently configured OEM air outlets. The new technique contemplates treating the air instantly as it is being discharged into the passenger compartment; yet remains compatible with existing OEM air filtration provision, some of which are provided at the cowl inlet, others are located mid stream within the ducting system.

28 Claims, 1 Drawing Sheet

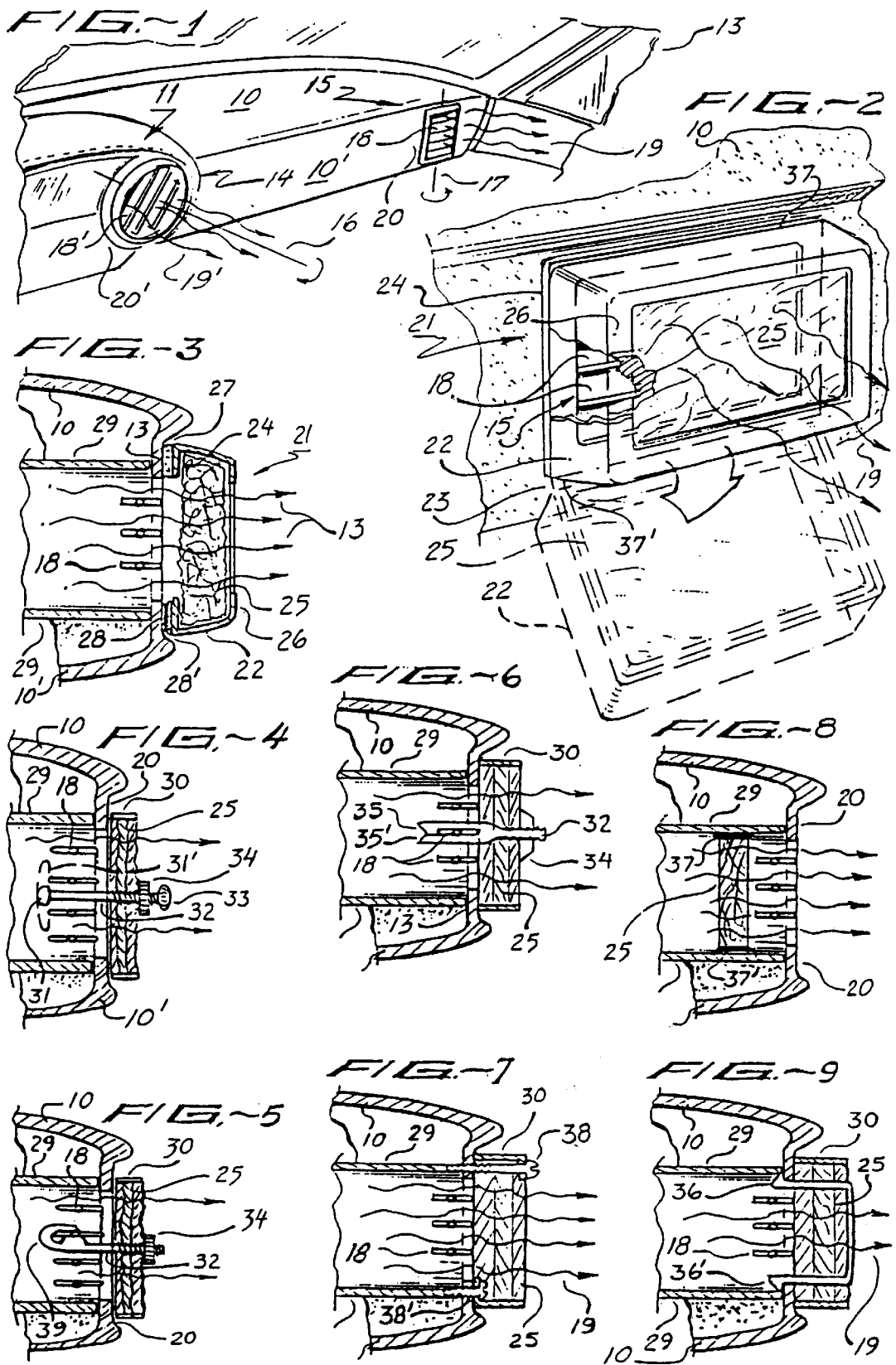

MOTOR-VEHICLE PASSENGER-COMPARTMENT AIR-CLEANER

This application claims the benefit of U.S. Provisional Application No. 60/006,045 filed on Oct. 24, 1995.

I.) BACKGROUND OF THE INVENTION

1. Field of the Invention

This invention relates generally to air-cleaning devices for use in a motor-vehicle such as for a car, truck, or airplane; and in particular, to air-cleaning devices of a type adapted to clean the air fed through the passenger-compartment or cockpit thereof, via existing air-ducting aperture(s).

2. Description of the Prior Art

It is commonly accepted that motor-vehicle internal-combustion engines must have clean air to operate properly, essentially to avoid costly engine repairs. However, providing clean air for the human occupants of motor-vehicles has been largely ignored, except in a few expensive luxury motorcars. Presently therefore, the average motorist cannot attain the "luxury" of affording such pre-filtered passenger-compartment air; so are constantly exposed en masse to the road-vehicle exhaust-fumes (carbon particulates, carbon-monoxide, hydrocarbons, oxides of nitrogen), rubber-tire dust, and brake-lining fibers (including asbestos). Moreover, mildew and mold tend to cultivate on heat-exchangers of moist air-conditioners or warm heaters, resulting in moldy spores being blown into the passenger-compartment via air outlet-duct apertures. A resulting moldy odor is most noticeable immediately upon activating the heater or air-conditioner's blowers. In addition, the dust, allergens-pollen, and pollutants within the passenger-compartment also get stirred-up by air blown into the passenger-compartment, whereupon it becomes an accumulative process, particularly aggressive within the intimate confines of a passenger-compartment. Furthermore, this adverse situation actually contributes to motorists feeling overly tired and depleted after a long drive on crowded roadways, owing to inhalation of these adverse air contaminants. Hence, a system devised to ameliorate this condition would contribute to a motorist's feeling of well-being, and thus increase automobile safety.

In the past, practically all efforts to cleanse air being discharged into the passenger-compartment have been directed toward placing a filter within the air-inlet or ducting system thereto, as have been patented chronologically per the following:

By Helwit in U.S. Pat. No. 3,941,034 (filed: July 1974), who shows a "filter attachment for automobile passenger-compartment air-intake"; which is essentially a cowl-intake situated OEM(original equipment manufacture) type arrangement, wherein a laminated porous-full-flow paper-filter is interspersed with activated charcoal. Therefore, the filter is positionally incapable of filtering-out contaminants within the ducting-system, nor can it filter-out contaminants recirculating within the vehicle's interior.

By Bach in French Pat. #2,636,013 (filed: February 1989), who shows both a screw-on and a tapered universally fitting dust-filter cartridge, either to be adapted to the passenger-compartment air-induction inlet of a vehicle; therefore still not addressing the need to filter the contaminants prevailing within the existing ducting passageways.

By Arold in U.S. Pat. No. 5,169,356(filed: July 1991, to Mercedes-Benz), who shows a "passenger-compartment air-filter"; which is made to install within an air-duct serving to draw-in stale-air from the passenger-compartment for recirculation, so as to treat secondary conditions of the air prior to it's being reintroduced into the passenger-compartment air/re-entry ducts. However, the system is not retrofitable to aftermarket installation, nor is it ideally situated at the final outlet stage of the air-ducting system.

By Kowalczyk in U.S. Pat. No. 5,192,346 (filed: July 1992), who shows an "air-purifier pleated-filter to stop pollution for passangers inside of a motor-vehicle"; which is again designed to provide a replaceable filtering media staged deep within the ducting-system.

By Gould in U.S. Pat. No. 5,350,444 (filed: April 1993), who shows a "filtered air-intake for a passenger-vehicle"; wherein an air-inlet and filtering-apparatus for the passenger-compartment is located at the cowl area beneath the hood, so cannot actually filter-out those contaminants prevailing within the ducting-system where it enters the cabin.

By Chiba in U.S. Pat. No. 5,368,620 (filed: August 1993), who shows a "device for cleaning surrounding-air fed into passenger-compartment of a motor-vehicle"; wherein an air-inlet and filtering-apparatus for the passenger-compartment is located at the cowl area beneath the hood, so like the previous example does not actually filter-out those contaminants found within the ducting-system where it enters the cabin.

By Hein in German Pat. #4,303,693 (filed: September 1993), who shows an electrostatic-cleaning device, with an air-filtering element again adapted to fit at the air-inlet stage, not at the air-outlet stage of the air-ducting system.

The preceding filtering apparatus also have the disadvantage of requiring OEM (Original Equip. Mfg.) modification to the vehicle structure; hence, are not really adaptable for retrofitting of an existing operating vehicle. In addition, the prior-art filtering described cannot effectively capture the mildew and mold tending to fester upon the heat-exchangers of moist air-conditioners or warm-air blown into the passenger-compartment via air outlet-ducts.

Therefore, in full consideration of the preceding patent review, there is determined a need for an improved form of device to which these patents have been largely addressed. The instant inventor hereof believes their newly improved passenger-air filtering device, commercially referred to as the "KLEENAIR"™, currently being developed for production under auspices of the Kim-Mfg./Mkt.Co., exhibits certain advantages as shall be revealed in the subsequent portion of this instant disclosure.

II.) SUMMARY OF THE INVENTION

A.) In view of the foregoing discussion about the earlier invention art, it is therefore important to make it pellucid to others interested in the art that the object of this invention is to provide a passenger-compartment air-cleaning device that can be easily retrofitted into existing motor-vehicles without involving some major form of modification to the vehicle. This device is capable of substantially removing dust, fungus-spores, allergens, and odors, known to arise from the ventilation-ducts and integrally-formed heat-exchangers of air-conditioning or heating units, as the air is blown into the passenger-compartment.

B.) It is another object of this invention disclosure to set forth a passenger-compartment air-cleaning device wherein the under-hood to cowling manner of location is understood to be inherently plagued by the adverse contaminant problem identified previously, wherein no manner of air-filtration arranged at the inleting of the system ducting can actually effectively deal with contamination downwind therefrom. Accordingly, this disclosure treats the problem by via an opposite arrangement, whereby the novel solution is an air-filtration appliance applied at the final air-discharge location, so as to engage the air-borne contaminants just as they escape into the passenger-compartment. Owing to the different structural configurations of existing ventilation-system air-discharge baffles, several generic-variants are explored. The effectiveness of the new air-filtration location is such that the user can if desired, actually remove the original OEM air-filtration unit, however it is believed that the combination of installing a clean OEM air-filter unit, plus installation of this new air-filtration at the final air-discharge outlet, will provide the ultimate in breathing protection to the motorist.

C.) It is a further object of this invention disclosure to set forth a passenger-compartment air-cleaning appliance, which treats the air as it instantly enters the passenger-compartment cabin confines; and, for this reason, is considered even more likely to be properly serviced periodically as air-borne contaminants eventually clog effectiveness of the filtering unit. Owing to the more conveniently accessible location of my new airfilter, it becomes then an item which the average motorist could be as able to attend to as well as the car-dealership service-manager; —and hence, at a substantial savings in labor cost as well. A low-cost air-filtration appliance according to one of the generic-variants proposed herein, if conveniently obtained from a popular neighborhood aftermarket autoparts retail-store, would cost only a fraction of the known higher retail-price charged by new-car parts-departments. Accordingly, the preferred embodiment of this disclosure, involves tool-free attaching means providing serviceably accessible replacement of the air-filter unit as a simple quick-detachment of the used unit, followed by quick-attach of the new unit; —conveniently from within the motor-vehicle's passenger-compartment.

E.) Another object of my invention disclosure hereof, is to provide a further generic-variant embodiment wherein the air-outlet airfilter-element appliance is so configured as to permit selective hinging away from the immediate outlet aperture, enabling the outleting-air to flow free of measurably constrictive air-drag (naturally imposed by added presence of the air-filter element being introduced herein). Although the offset hinging member can be placed above the air-filter element, so the invention appliance can swing upward, or laterally to left or right; it is preferred that the airfilter-element's optionally positioned offset hinge be arranged to take advantage of gravity, whereby the air-filter housing portion manually swings downward away from significantly constricting free-flow of discharging-air. This provision is desired primarily only during periods of system air-blower operation when maximum volumetric-efficiency is needed; such as for example, when initial hot-day rapid cool-down of the passenger-compartment is called for.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature; wherein:

FIG. 1, is a pictorial view of an existing (not necessarily patented) OEM prior-art dashboard structural configuration, which passenger-compartment air discharge-outlet is conventionally absent of any supplemental air-filtering appliance thereto;

FIG. 2, is a greatly enlarged pictorial aspect thereof, showing only the air-outlet represented at far left of FIG. 1, including installation of my air-filter appliance housing installation having an exemplified optionally bottom-hinged access-cover, whereto a phantom-outline shows an the alternate open mode of operation;

FIG. 3, is a cross-sectional side/elevation-view of the air-outlet apparatus, suggesting generic-variant embodiments thereof, here demonstrating both hook-&-loop fastener, and double-face foam-tape attachment;

FIG. 4, is a generic-variant embodiment thereof, here employing a T-bar engagement device as an attachment means, including a phantom-outline showing how the device is rotated 90-degrees to attain positive retention, plus an optional slack-adjuster device is shown;

FIG. 5, is a generic-variant embodiment thereof, employing a 180-degree hooking arrangement, also serving to positively lock the variable-louvers into full open attitude;

FIG. 6, is a generic-variant embodiment thereof, here employing a snap-on flexile hooking device arrangement;

FIG. 7, is a generic-variant embodiment thereof, here employing threaded-fasteners in both concealed and unconcealed methods;

FIG. 8, is a generic-variant embodiment thereof, here employing adhesive attachment means within the walls of the final air-discharge ducting;

FIG. 9, is a generic-variant embodiment thereof, here employing bifurcated-flexile-fingers providing a convenient snap-on action.

V.) DETAILED DESCRIPTION OF THE PREFERRED EMBODIMENTS

Initial reference is given by way of prior-art FIG. 1, wherein is exhibited a portion of an OEM transverse dashboard 10, adjacent windshield 12, and contiguous right-side door windowglass 13. The left-side of the dashboard 10 generally includes an instrument-panel cluster 11, shown here including an exemplified circular air-duct outlet having grille like louvers 18' and surround fascia or bezel portion 20. To the far right side of the dashboard is shown an exemplified companion air-duct outlet grille but of the rectangular type. usually comprised of variable-pitch angle louvers 18 which are manually adjustable from closed to horizontally open (as shown here); usually both such exemplified air-outlets being arranged in fluid-communication with a common air-ducting system, details of which are not depicted here in as much as the invention is only concerned with the instantly exiting air provisions. Generally however, such automotive type air-outlets per FIG. 1 include some manner of air directional-control means, either via a rotational swivel-axis such as 16, or via a vertical or horizontal pivot-axis 17.

In enlarged view of FIG. 2 is depicted a closer detail of air-outlet 15 as appeared in FIG. 1, here including the addition of my special overall supplemental air-filtration appliance 21. Note here how an air-filter housing-bezel 24 is preferably constructed with an adjoining cover portion 22 connected via a housing hinge-axis 23. Universal appliance 21 is preferably adapted to fit around the perimeter of aperture 15 on the sides of the dashboard fascia 20, so as to thereby cause all discharging duct-air to pass through provisional air-filter element 25. Air-outlets of the circular type (11 per FIG. 1) are similarly addressed, preferably via a matching circular air-filter cartridge unit. Continued reference to FIG. 2, shows how the installed assembly of FIG. 1 appears with the receiver-flange door 22 opened via transverse flexile-hinge portion 23' contained within the housing is a replaceable air-filter unit 24 as may be fabricated from any conventional commercially available air-filtration material permeable to the flow-through of forced-air issuing by means of a conventional electric air-blower housed within the conventional air-ducting system, all of which is concealed behind OEM dashboard 10/10' of FIG. 1.

Reference to FIG. 3 detail of the invention shows a cross-section of an installed appliance hereof, wherein a frame like fixed portion is shown having mounting-flange bezel 24, whereby commercially available double-face foam type mounting-tape 27 is exemplified here to achieve attachment. A receiver-cover portion 22 preferably has a perimeter retention-flange portion 26 by which to retain the preferably replaceable air-filter element material (or cartridge unit) 25. The similar housing-cover 22 of FIG. 2 however, being openable to alternate position 22', so as to either facilitate easy drop-in replacement of air-filter 25, or alternately enabling user to bypass the provisional air-filter hereof so as to facilitate unobstructed free-flow of blown-air 19. Also note in FIG. 3, that an optional adhesive material (such as may be dispensed from a capped-tube) may be substituted in place of the foam-tape 27, which would be any commercially available thickened polymer-resin dispersion capable of smoothly filling-in small irregularities such as any stepped-surface crevices, etc. An alternate means of attachment is also exemplified in FIG. 3, wherein a conventional two-piece hook 28 & loop 28' VELCRO® type perimeter fastener may be substituted, enabling user to periodically more conveniently remove and discard a dirty used air-filter unit 25 with a fresh new unit, simply by repressing the mating hook & loop portions together.

There remain subtle, however vital differences which are to become more evident and understood as important improvements. Detail cross-section of FIG. 4 shows how a special toggle-bolt or T-bar device having T-anchor portion 31, contiguous male-threaded shaft 32, and co-acting female screw-threaded finger-turned adjuster-nut 33; functions to readily hold an air-filter unit 25 intimately to the surround-fascia 20 of dash air-outlet 15. Since rotary elongated finger-knob 33 is preferably oriented parallel with the T-bar, it acts to let the installer instantly know if they have rotated the internally obscured T-bar to a position 90-degrees to the plane of the louvers 18 as shown in FIG. 4. Note also in FIG. 4, that optional female screw-threaded adjuster-nut 34 enables installer to make sufficient axial-adjustment take-up of screw-threaded bar 32 as to eliminate any excessive slack which could cause an undesirable loose mounting relative to surround-fascia 13.

Reference to FIG. 5 shows another generic-variant embodiment, wherein shaft 32 is terminated inwardly (into air-outlet 15) via a 180-degree wraparound hanger-hook device 39, which by virtue of it's intimate two-sided impingement upon an existing louver 18; so that adjustment of the outer female screw-threaded adjuster-nut 34 tightens the assembly snugly in place. FIG. 6 demonstrates a similar arrangement to that of FIG. 5, but further provides a special self-locking snap-action combination snap-paw 35 and slider-spade 35', which device presses into positive engagement upon the existing louver 18 enters via the thus formed flexile-mouth, and slips-on until the snap-paw 35 ultimately snaps-shut, thereby holding louver aggregation 18 in full-open attitude, assuring maximum volumetric-airflow through the air-filter appliance.

Further generic-variant example of FIG. 7, shows a more invasive air-filter appliance attachment means, whereby conventional screw-fasteners 29 can be employed to secure the appliance 25 in place. Such an attachment method would be more appropriate to utility-vehicles, such as in rugged truck cabin interiors. Air-filtration unit 25 preferably includes a rigid perimeter-frame 30; and, is held intimately against dash outlet fascia 20. The exemplified upper external screw-fastener 38 is threaded into the existing fascia surface 20, while exemplified internally concealed screw-fastener 38' below is considered less obtrusive and safely submerged beneath the air-filtration material 25.

Example of FIG. 8 shows an internal attachment of the air-filter unit 25 proximal to the existing air-outlet 15 and louvers 18: which would necessarily more than the other generic-variant examples herein, constitute an OEM installation, in as much as the position is to difficult in aftermarket or retrofit applications to which the other examples herein generally easily apply. In FIG. 8, the air-duct walls 29 actually support the air-filtration material 25 via expedient application of an adhesive-resin 37/37' thereto. Hence, while such an arrangement is the most concealed, it is inconvenient to replace when dirty, so it presents a less commercially viable alternative to cleansing the exiting air. Nevertheless, it is still within the spirit and scope of the present invention.

Example of FIG. 9 shows how opposed spaced-apart bifurcated flexile-fingers 36/36' having integrally formed entry-ramp surfaces, enables the air-filtration appliance 25 to be readily pressed on until it audibly "clicks" into positive engagement upon the existing flange-like circumference of dash air-outlet aperture fascia 20.

In the generic-variant examples set forth here, the air-filtration material 25 is merely represented as a preferably plural layered embodiment of perhaps differently made air-filtration materials, which may be of the porous paper composition type comprising random multi-fiberous rovings, or other air-permeable material such as open-celled polymer-foam material. For example, to achieve greater filtration effectiveness, fiberous-paper may be combined with activated-charcoal; or, the air-filtration material may be treated with a tacky substrate, effectively serving to physically capture minute contamination particles carried with the flowing air. The air-filtration material may be housed within a suitable containment-housing as suggested in some cases herein, or in any case, it is desired that the exiting air be directed entirely through the air-filtration material. In any case, it is desired that the air-filtration be configured to a shape of greater width and height than it's thickness, —thereby minimizing effect of air-drag resistance there through. In some applications, it would be desirable to include an aromatic substrate substance, which would provide an air-freshening effect appealing to some users, such as pine-scent, lemon-scent, mint-scent, etc.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described is to before by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, are defined as follows.

I claim:

1. An external air filtration appliance for use with vehicle air outlet located on the dashboard fascia of the passenger compartment of a motor vehicle, comprising:

an air filter having air entrance and exit sides, said filter further having one or more bezels located on said air entrance side, such that said bezels adjoin said air entrance side of said air filter to said dashboard fascia externally around the perimeter of said vehicle air outlet; and an attaching means for holding said bezels intimately against said dashboard fascia, said attaching means being serviceably accessible from within said vehicle passenger compartment.

2. The air filtration appliance according to claim 1, wherein said vehicle air outlet exists as it was originally manufactured.

3. The air filtration appliance according to claim 1, wherein said vehicle air outlet is factory configured to facilitate adaptation of said appliance.

4. The air filtration appliance according to claim 1, wherein said attaching means comprises a hook and loop configuration having one piece adhesively affixed to said dashboard fascia, and having the corresponding piece affixed to said bezels of said housing.

5. The air filtration appliance according to claim 1, wherein said attaching means comprises double-faced adhesive tape.

6. The air filtration appliance according to claim 1, wherein said attaching means comprises polymer resin.

7. The air filtration appliance according to claim 1, wherein said air filter comprises porous paper.

8. The air filtration appliance according to claim 7, wherein said porous paper comprises random multifiberous rovings.

9. The air filtration appliance according to claim 7, wherein said air filter comprises plural layers of said porous paper.

10. The air filtration appliance according to claim 1, wherein said air filter comprises a polymer foam.

11. The air filtration appliance according to claim 1, wherein said air filter comprises activated charcoal.

12. The air filtration appliance according to claim 1, wherein said air filter is configured to a shape such that the width and height are greater than the thickness.

13. The air filtration appliance according to claim 1, wherein said air filter comprises a tacky substrate.

14. An external air filtration appliance for use with a vehicle air outlet located on the dashboard fascia of the passenger compartment of a motor vehicle, comprising:

a housing having opposing open air entrance and exit sides, said housing further having a plurality of bezels located on said air entrance side, such that said housing bezels adjoin said air entrance side of said housing to said dashboard fascia externally around the perimeter of said vehicle air outlet;

an attaching means for holding said bezels intimately against said dashboard fascia, said attaching means being serviceably accessible from within said vehicle passenger compartment; and a replaceable air filter adapted to reside within said housing such that the air exiting the vehicle air outlet passes into said air entrance side of said housing, through said air filter, and exits through said exit side of said housing.

15. The air filtration appliance according to claim 14, wherein said appliance further comprises a cover portion, said cover portion having opposing open air entrance and exit sides, said cover portion further being connected to said housing via a housing-hinge axis shared between one side of said cover portion and a corresponding side of said housing, such that said cover portion is capable of rotating at said axis between open and closed positions.

16. The air filtration appliance according to claim 15, wherein said air filter is adapted to reside within said cover portion.

17. The air filtration appliance according to claim 14, wherein said vehicle air outlet exists as it was originally manufactured.

18. The air filtration appliance according to claim 14, wherein said vehicle air outlet is factory configured to facilitate adaptation of said appliance.

19. The air filtration appliance according to claim 14, wherein said attaching means comprises a hook and loop configuration having one piece adhesively affixed to said dashboard fascia, and having the corresponding piece affixed to said bezels of said housing.

20. The air filtration appliance according to claim 14, wherein said attaching means comprises double-faced adhesive tape.

21. The air filtration appliance according to claim 14, wherein said attaching means comprises polymer resin.

22. The air filtration appliance according to claim 14, wherein said air filter comprises porous paper.

23. The air filtration appliance according to claim 22, wherein said porous paper comprises random multifiberous rovings.

24. The air filtration appliance according to claim 22, wherein said air filter comprises plural layers of said porous paper.

25. The air filtration appliance according to claim 14, wherein said air filter comprises a polymer foam.

26. The air filtration appliance according to claim 14, wherein said air filter comprises activated charcoal.

27. The air filtration appliance according to claim 14, wherein said air filter is configured to a shape such that the width and height are greater than the thickness.

28. The air filtration appliance according to claim 14, wherein said air filter comprises a tacky substrate.

* * * * *